(12) United States Patent
Morihiro (10) Patent No.: US 9,664,097 B2
(45) Date of Patent: May 30, 2017

(54) CONTROL APPARATUS FOR INTERNAL COMBUSTION ENGINE

(71) Applicant: Toyota Jidosha Kabushiki Kaisha, Toyota-shi, Aichi-ken (JP)

(72) Inventor: Kinji Morihiro, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 139 days.

(21) Appl. No.: 14/837,384

(22) Filed: Aug. 27, 2015

(65) Prior Publication Data

US 2016/0061138 A1    Mar. 3, 2016

(30) Foreign Application Priority Data

Sep. 2, 2014    (JP) .................................. 2014-178369

(51) Int. Cl.
| | |
|---|---|
| *F01N 3/00* | (2006.01) |
| *F01N 11/00* | (2006.01) |
| *F02D 41/14* | (2006.01) |
| *F02D 41/24* | (2006.01) |
| *F02D 41/30* | (2006.01) |
| *F01N 3/10* | (2006.01) |

(52) U.S. Cl.
CPC ........ *F01N 11/007* (2013.01); *F02D 41/1441* (2013.01); *F02D 41/1456* (2013.01); *F02D 41/2461* (2013.01); *F02D 41/3094* (2013.01); *F01N 3/101* (2013.01); *F02D 2041/147* (2013.01); *Y02T 10/22* (2013.01)

(58) Field of Classification Search
CPC .... F01N 11/007; F01N 3/101; F02D 41/1441; F02D 41/1456; F02D 41/2461; F02D 41/3094; F02D 2041/147
See application file for complete search history.

(56) References Cited

U.S. PATENT DOCUMENTS

2007/0119415 A1* 5/2007 Lewis ................... F01N 11/007
                                                        123/295
2012/0277979 A1* 11/2012 Kato ................... F02D 41/0085
                                                        701/104

FOREIGN PATENT DOCUMENTS

| JP | 2009-030455 A | 2/2009 |
| JP | 2012-233425 A | 11/2012 |

* cited by examiner

*Primary Examiner* — Phutthiwat Wongwian
*Assistant Examiner* — Matthew T Largi
(74) *Attorney, Agent, or Firm* — Dinsmore & Shohl LLP (57) ABSTRACT

A control apparatus for an internal combustion engine includes an electronic control unit. The electronic control unit corrects a target air-fuel ratio in an air-fuel ratio control with a first correction value set based on a degree of variation among cylinders in terms of a fuel amount to be injected from the port injector, and a second correction value set based on a degree of variation among the cylinders in terms of a fuel amount to be injected from the in-cylinder injector. A first correction amount of the target air-fuel ratio by the first correction value is set to be larger as an injection amount ratio of the intake-port fuel injection valve is larger, and a second correction amount of the target air-fuel ratio by the second correction value is set to be larger as an injection amount ratio of the in-cylinder fuel injection valve is larger.

7 Claims, 5 Drawing Sheets

PORT STOICHIOMETRY BASE VALUE SBAp

HIGH ↑
ENGINE LOAD KL
↓ LOW

SBAp (KLm, NE1) . . . . . . . SBAp (KLm, NEn)

SBAp (KL1, NE1) . . . . . . SBAp (KL1, NEn)

LOW ← ENGINE ROTATION SPEED NE → HIGH

FIG. 6

IN-CYLINDER STOICHIOMETRY BASE VALUE SBAd

HIGH ↑
ENGINE LOAD KL
↓ LOW

SBAd (KLm, NE1) . . . . . . . SBAd (KLm, NEn)

SBAd (KL1, NE1) . . . . . . SBAd (KL1, NEn)

LOW ← ENGINE ROTATION SPEED NE → HIGH

FIG. 7

CONTROL APPARATUS FOR INTERNAL COMBUSTION ENGINE

INCORPORATION BY REFERENCE

The disclosure of Japanese Patent Application No. 2014-178369 filed on Sep. 2, 2014 including the specification, drawings and abstract is incorporated herein by reference in its entirety.

BACKGROUND OF THE INVENTION

1. Field of the Invention

The present invention relates to a control apparatus for an internal combustion engine.

2. Description of Related Art

There has been known an internal combustion engine which includes an intake-port fuel injection valve for injecting a fuel to an intake port and an in-cylinder fuel injection valve for directly injecting a fuel into a combustion chamber and which changes a fuel injection mode by changing an injection amount ratio between the fuels to be injected from those fuel injection valves according to an engine operation state.

Further, generally, an internal combustion engine is provided with a sensor for outputting an output value corresponding to an oxygen concentration in exhaust gas in order to yield exhaust-gas purification performance of a catalyst provided in an exhaust passage. An air-fuel ratio control of correcting a fuel injection amount so that an output value of the sensor achieves an output value corresponding to a target air-fuel ratio is performed.

In the meantime, it is also known that, even if the air-fuel ratio control is performed, a variation in the air-fuel ratio is caused among cylinders. In view of this, Japanese Patent Application Publication No. 2012-233425 (JP 2012-233425 A) or the like, for example, describes such a technique that, in a case where a variation in an air-fuel ratio is caused among cylinders, it is identified which causes such a variation failure, an intake-port fuel injection valve or an in-cylinder fuel injection valve, and then, a degree of the variation failure is calculated.

When air-fuel ratios of some of the cylinders deviates toward a rich side, for example, relative to air-fuel ratios of the other cylinders, a concentration of hydrogen exhausted from the cylinders increases, so that a sensor for detecting an air-fuel ratio detects hydrogen, thereby resulting in that an output value of the sensor deviates toward a rich side relative to an output value corresponding to an actual air-fuel ratio. This is described in Japanese Patent Application Publication No. 2009-30455 (JP 2009-30455 A), or the like, for example.

When the output value of the sensor deviates toward the rich side as such, a fuel injection amount is wrongly corrected to be decreased in the air-fuel ratio control, so that the actual air-fuel ratio deviates toward a lean side. Accordingly, when a variation occurs among the cylinders and the output value of the sensor for detecting an air-fuel ratio deviates from the actual air-fuel ratio, it is preferable that a target air-fuel ratio be corrected just by a deviation of the output value of the sensor, so as to restrain false correction of the fuel injection amount by the air-fuel ratio control.

Here, the deviation of the output value of the sensor is changed according to a degree of variation among the cylinders. However, in a case of the internal combustion engine including the intake-port fuel injection valve and the in-cylinder fuel injection valve, a degree of variation among the cylinders in terms of a fuel amount to be injected from the intake-port fuel injection valve often differs from a degree of variation among the cylinders in terms of a fuel amount to be injected from the in-cylinder fuel injection valve. Accordingly, unless the aforementioned correction of the target air-fuel ratio to restrain false correction is performed appropriately in accordance with a fuel injection mode, it is difficult to sufficiently restrain the false correction of the fuel injection amount, which may cause an adverse effect on exhaust-gas purification performance.

SUMMARY OF THE INVENTION

The present invention is accomplished in view of the actual circumstances, and provides an internal combustion engine which includes an intake-port fuel injection valve and an in-cylinder fuel injection valve but which can restrain a decrease in purification performance of gas discharged from the internal combustion engine which decrease is caused due to a variation among cylinders of the internal combustion engine.

In view of this, one aspect of the present invention provides an internal combustion engine including an intake-port fuel injection valve, an in-cylinder fuel injection valve, a catalyst, an upstream-side sensor, and an electronic control unit. The intake-port fuel injection valve is provided in each of a plurality of cylinders, and the intake-port fuel injection valve is configured to inject fuel into an intake port of the internal combustion engine. The in-cylinder fuel injection valve is provided in each of the plurality of cylinders of the internal combustion engine, and the in-cylinder fuel injection valve is configured to inject fuel into a combustion chamber of the internal combustion engine. The catalyst is provided in an exhaust passage of the internal combustion engine, and the catalyst is configured to purify gas exhausted from the internal combustion engine. The upstream-side sensor is configured to output an output value corresponding to an actual air-fuel ratio on an upstream side relative to the catalyst. Further, the electronic control unit is configured to (i) change, according to an engine operation state, injection amount ratios of the fuel to be injected from the intake-port fuel injection valve and the fuel to be injected from the in-cylinder fuel injection valve, relative to a total fuel amount to be injected from the intake-port fuel injection valve and the in-cylinder fuel injection valve, (ii) execute an air-fuel ratio control of controlling the actual air-fuel ratio to a target air-fuel ratio by correcting the total fuel amount so that the output value of the upstream-side sensor achieves an output value corresponding to a target air-fuel ratio, (iii) detect a first variation degree indicative of a degree of variation among the cylinders in terms of a fuel amount to be injected from the intake-port fuel injection valve, (iv) detect a second variation degree indicative of a degree of variation among the cylinders in terms of a fuel amount to be injected from the in-cylinder fuel injection valve, (v) set a first correction value based on the first variation degree such that a first correction amount of the target air-fuel ratio by the first correction value is set to be larger as the injection amount ratio of the intake-port fuel injection valve is larger, (vi) set a second correction value based on the second variation degree such that a second correction amount of the target air-fuel ratio by the second correction value is set to be larger as the injection amount ratio of the in-cylinder fuel injection valve is larger, and (vii) correct the target air-fuel ratio with the first correction value and the second correction value. Note that the "output value corresponding to the target air-fuel ratio" indicates an output value to be output from the upstream-side sensor at the time when an actual air-fuel ratio accords with the target air-fuel ratio.

The deviation of the output value of the upstream-side sensor due to a variation among the cylinders becomes larger as the first variation degree, which is a degree of variation among the cylinders in terms of a fuel amount to be injected from the intake-port fuel injection valve, or the second variation degree, which is a degree of variation among the cylinders in terms of a fuel amount to be injected from the in-cylinder fuel injection valve is larger. Further, an influence of such a first variation degree and such a second variation degree with respect to the deviation of the output value of the upstream-side sensor also changes according to the injection amount ratios of the intake-port fuel injection valve and the in-cylinder fuel injection valve.

In view of this, in the configuration of the above internal combustion engine, the target air-fuel ratio in the air-fuel ratio control is corrected with the first correction value and the second correction value. The first correction value is set based on the first variation degree indicative of a degree of variation among the cylinders in terms of a fuel amount to be injected from the intake-port fuel injection valve and the injection amount ratio of the intake-port fuel injection valve. Further, the second correction value is set based on the second variation degree indicative of a degree of variation among the cylinders in terms of a fuel amount to be injected from the in-cylinder fuel injection valve and the injection amount ratio of the in-cylinder fuel injection valve. Accordingly, the target air-fuel ratio is corrected according to the first variation degree, the second variation degree, and the injection amount ratios. Accordingly, correction of the target air-fuel ratio to restrain false correction is performed appropriately in accordance with a fuel injection mode and the degree of variation among the cylinders, so that deviation of an actual air-fuel ratio due to false correction of the fuel injection amount is restrained appropriately. According the configuration of the internal combustion engine, even in a case where the intake-port fuel injection valve and the in-cylinder fuel injection valve are provided, it is possible to restrain a decrease in purification performance of gas exhausted from the internal combustion engine which decrease is caused due to a variation among the cylinders.

That deviation of the output value of the upstream-side sensor which is caused due to the variation among the cylinders changes according to a degree of variation among the cylinders, as described above. Further, even in a case where the degree of variation among the cylinders is the same, if the engine load and the engine rotation speed are different, an influence of a hydrogen concentration in exhaust gas with respect to the output value of the upstream-side sensor tends to become different. In view of this, in the above internal combustion engine, the electronic control unit may be configured to set the first correction value to correct the target air-fuel ratio, based on the first variation degree, the engine load, and the engine rotation speed. Similarly, in the above internal combustion engine, the electronic control unit may be configured to set the second correction value to correct the target air-fuel ratio, based on the second variation degree, the engine load, and the engine rotation speed.

In terms of how to obtain the first correction value, the electronic control unit may be configured to obtain the first correction value from a map that uses variables including the first variation degree, the engine load, and the engine rotation speed. Alternatively, the electronic control unit may be configured to obtain the first correction value from a functional formula that uses variables including the first variation degree, the engine load, and the engine rotation speed.

In terms of how to obtain the second correction value, the electronic control unit may be configured to obtain the second correction value from a map that uses variables including the second variation degree, the engine load, and the engine rotation speed. Alternatively, the electronic control unit may be configured to obtain the second correction value from a functional formula that uses variables including the second variation degree, the engine load, and the engine rotation speed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An internal combustion engine as an example of an embodiment of the present invention is described below with reference to FIGS. 1 to 7. Note that the internal combustion engine is a so-called multi-cylinder internal combustion engine including a plurality of cylinders.

Figure 1:
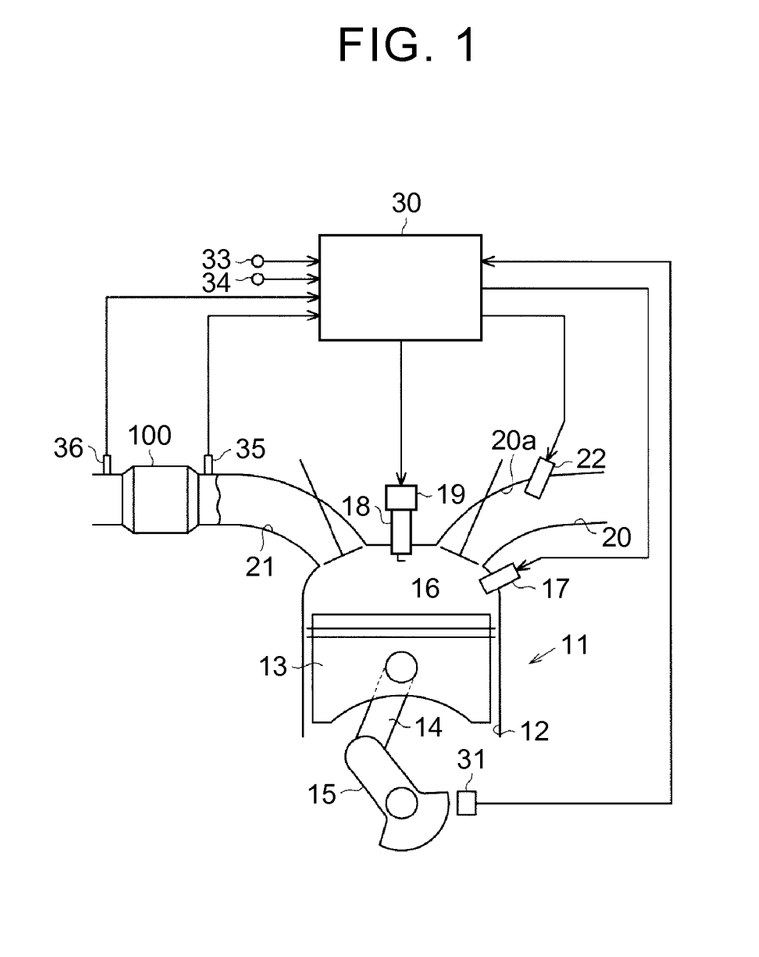
FIG. 1 is a schematic view illustrating a structure of an internal combustion engine of an embodiment as an example of an internal combustion engine of the present invention.

As illustrated in FIG. 1, a piston 13 is provided in each cylinder 12 of an internal combustion engine 11. The piston 13 is connected to a crankshaft 15, which is an output shaft of the internal combustion engine 11, via a connecting rod 14, so that a reciprocating motion of the piston 13 is converted to a rotary motion of the crankshaft 15 by the connecting rod 14.

A combustion chamber 16 is sectioned above the piston 13 in each cylinder 12, and an in-cylinder injector 17 (an in-cylinder fuel injection valve) for injecting fuel toward the combustion chamber 16 is provided. Predetermined high-pressure fuel is supplied to the in-cylinder injector 17 through a well-known fuel supply mechanism. Due to valve opening driving of the in-cylinder injector 17, the fuel is supplied to the combustion chamber 16 by direct injection, so that so-called cylinder injection is performed.

Further, an ignition plug 18 for igniting a fuel/air mixture, which is formed inside the combustion chamber 16 and constituted by fuel and air, is attached to the combustion chamber 16. An ignition timing to the fuel/air mixture by the ignition plug 18 is adjusted by an igniter 19 provided above the ignition plug 18.

The combustion chamber 16 communicates with an intake passage 20 and an exhaust passage 21. An intake port 20a constituting a part of the intake passage 20 is provided with a port injector 22 (an intake-port fuel injection valve) for injecting fuel into the intake port 20a. Fuel at a predetermined pressure is supplied to the port injector 22 through a well-known mechanism. Due to valve opening driving of the port injector 22, the fuel is injected into the intake port 20a, so that so-called port injection is performed. Note that the intake passage 20 is provided with a throttle valve for adjusting an air volume to be introduced into the combustion chamber 16.

In a middle of the exhaust passage 21, a catalyst 100 having a function to purify gas discharged from the internal combustion engine 11 at the time when an air-fuel ratio of the fuel/air mixture has a value within a predetermined range is provided. More specifically, when the air-fuel ratio of the fuel/air mixture is a theoretical air-fuel ratio, injurious ingredients (mainly, HC, CO, NOx) in exhaust gas is effectively purified by the catalyst 100.

That part of the exhaust passage 21 which is on an upstream side relative to the catalyst 100 is provided with an upstream-side sensor 35 for outputting an output value V1 corresponding to an upstream actual air-fuel ratio AFf, which is an actual air-fuel ratio on an upstream side relative to the catalyst 100. The upstream-side sensor 35 is a well-known air-fuel ratio sensor, and outputs an output value V1 having a magnitude proportional to that air-fuel ratio of the fuel/air mixture which has a close relationship with an oxygen concentration in the exhaust gas. That is, as the air-fuel ratio of the fuel/air mixture changes from a rich side to a lean side, the output value V1 of the upstream-side sensor 35 linearly increases.

That part of the exhaust passage 21 which is on a downstream side relative to the catalyst 100 is provided with a downstream-side sensor 36 for outputting an output value V2 corresponding to a downstream actual air-fuel ratio AFr, which is an actual air-fuel ratio on a downstream side relative to the catalyst 100. The downstream-side sensor 36 is a well-known oxygen sensor. When the air-fuel ratio of the fuel/air mixture is richer than a theoretical air-fuel ratio, an output voltage of around 1 volt is obtained, and when the air-fuel ratio of the fuel/air mixture is leaner than the theoretical air-fuel ratio, an output voltage of around 0 volt is obtained. Further, there is such a characteristic that an output voltage suddenly changes from around the theoretical air-fuel ratio. Accordingly, although the downstream-side sensor 36 outputs the output value V2 corresponding to the downstream actual air-fuel ratio AFr, the output value V2 does not change linearly according to a change of the downstream actual air-fuel ratio AFr. The output value V2 is used to determine whether an actual air-fuel ratio on a downstream side relative to the catalyst 100 is richer or leaner than the theoretical air-fuel ratio.

Various controls of the internal combustion engine 11 are performed by a control device 30. The control device 30 is an electronic control unit including a central processing unit (CPU) that performs various processes related to an engine control, a memory in which to store information necessary for control programs and the engine control, driving circuits for the in-cylinder injector 17 and the port injector 22, and driving circuits for the igniter 19 and the like, etc.

Various sensors for detecting an engine operation state are connected to the control device 30 as well as the upstream-side sensor 35 and the downstream-side sensor 36. For example, a crank angle of the crankshaft 15 is detected by a crank sensor 31, and an engine rotation speed NE is calculated based on this. Further, an accelerator operation amount ACCP is detected by an accelerator sensor 33. Further, an intake-air amount GA is detected by an air-flow meter 34. The control device 30 performs various controls such as a fuel injection control, an air-fuel ratio control, and an ignition timing control according to that operating state of the internal combustion engine 11 which is grasped from detection signals of such various sensors.

Figure 2:
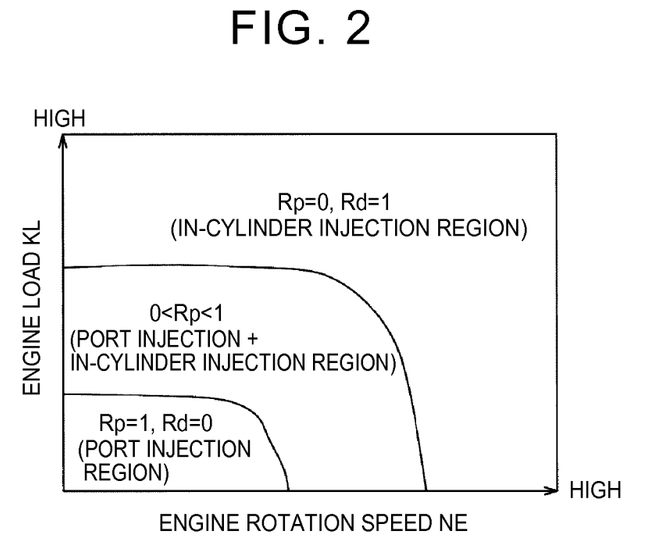
FIG. 2 is a conception diagram illustrating separate injection regions of the internal combustion engine with a horizontal axis being taken as an engine speed and a vertical axis being taken as an engine load.

The control device 30 changes injection modes by performing separate fuel injection by the in-cylinder injector 17 and the port injector 22. As illustrated in FIG. 2, for example, only port injection by the port injector 22 is performed in a low-loading and low-rotation region, and port injection and in-cylinder injection using both the port injector 22 and the in-cylinder injector 17 are performed in a middle-load and middle-rotation region. Further, only in-cylinder injection by the in-cylinder injector 17 is performed in a heavy-load and high-rotation region. Note that separate injection regions illustrated in FIG. 2 are one example, and can be changed appropriately.

The separate fuel injection is executed by variously changing a port injection amount ratio Rp indicative of a ratio of a fuel amount to be injected from the port injector 22 relative to a fuel injection amount Q set based on an engine operation state.

The port injection amount ratio Rp is set variably within a range of "0≤Rp≤1" based on the engine operation state such as an engine load KL and an engine rotation speed NE. A fuel amount obtained by multiplying the fuel injection amount Q by the port injection amount ratio Rp is set as a fuel injection amount of the port injector 22. In the meantime, a value obtained by subtracting the port injection amount ratio Rp from "1" is calculated as an in-cylinder injection amount ratio Rd indicative of a ratio of a fuel amount to be injected from the in-cylinder injector 17 relative to the fuel injection amount Q (Rd=1−Rp). A fuel amount obtained by multiplying the fuel injection amount Q by the in-cylinder injection amount ratio Rd is set as a fuel injection amount of the in-cylinder injector 17.

In a case of the example illustrated in FIG. 2, in the low-loading and low-rotation region, the port injection amount ratio Rp is set to "1" and the in-cylinder injection amount Rd is set to "0." Further, in the middle-load and middle-rotation region, the port injection amount ratio Rp is set variably within a range of "0<Rp<1," and along with this, the in-cylinder injection amount ratio Rd is also set variably. Furthermore, in the heavy-load and high-rotation region, the port injection amount ratio Rp is set to "0" and the in-cylinder injection amount ratio Rd is set to "1." As such, in the present embodiment, by variably setting the port injection amount ratio Rp according to the engine operation state, the in-cylinder injection amount ratio Rd is also naturally set variably.

Further, the control device 30 monitors whether or not a variation in the air-fuel ratio occurs among the cylinders of the internal combustion engine 11. More specifically, one reason to cause such a variation in the air-fuel ratio is a variation in the fuel injection amount among the cylinders, so that the control device 30 grasps an imbalance rate IMB, which is an index value indicative of a variation in the fuel injection amount among the cylinders.

Figure 3:
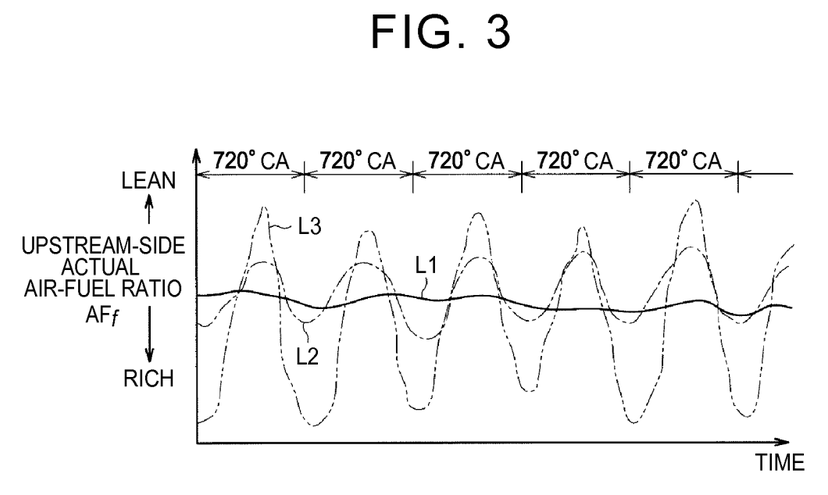
FIG. 3 is a time chart illustrating fluctuations in an upstream-side actual air-fuel ratio according to a degree of variation among cylinders of the internal combustion engine.

FIG. 3 illustrates fluctuations of the air-fuel ratio per one cycle (720° CA) in which all cylinders of a four-cylinder engine finish combustion, and particularly, illustrates a fluctuation state of an upstream actual air-fuel ratio AFf detected by the upstream-side sensor 35 in a case where a fuel injection amount of a given cylinder is changed intentionally so as to cause a variation in the fuel injection amount among the cylinders. Note that a continuous line L1 illustrated in FIG. 3 indicates fluctuations of the upstream actual air-fuel ratio AFf when no variation occurs among the cylinders. Further, an alternate long and short dash line L2 indicates fluctuations of the upstream actual air-fuel ratio AFf at the time when a variation occurs among the cylinders by changing a fuel injection amount of a given cylinder just by a predetermined amount A1. An alternate long and two short dashes line L3 indicates fluctuations of the upstream actual air-fuel ratio AFf at the time when a variation occurs among the cylinders by changing a fuel injection amount of a given cylinder just by a predetermined amount A2, which is larger than the predetermined amount A1.

As indicated by the continuous line L1 in FIG. 3, the upstream actual air-fuel ratio AFf repeats a periodic fluctuation with one cycle of the internal combustion engine 11 being taken as one period. As indicated by the alternate long and short dash line L2, when a variation in the fuel injection amount occurs among the cylinders and a difference in the air-fuel ratio occurs among the cylinders, a fluctuation amount of the upstream actual air-fuel ratio AFf in one cycle increases. As indicated by the alternate long and short dash line L2 and the alternate long and two short dashes line L3, as a difference in the fuel injection amount among the cylinders is larger, that is, as a degree of variation in the fuel injection amount among the cylinders is larger, the fluctuation amount of the upstream actual air-fuel ratio AFf becomes larger.

In view of this, in the present embodiment, the imbalance rate IMB indicative of the degree of variation among the cylinders is detected based on a value correlated with the fluctuation amount of the upstream actual air-fuel ratio AFf (e.g., a magnitude of an inclination of a signal output from the upstream-side sensor 35, a change velocity of the upstream actual air-fuel ratio AFf, a fluctuation amount of the upstream actual air-fuel ratio AFf within a given period, or the like). More specifically, the value correlated with the fluctuation amount of the upstream actual air-fuel ratio AFf is detected, and based on the value thus detected, a value of the imbalance rate IMB is set to be larger as the fluctuation amount is larger.

Further, in the present embodiment, in order to increase accuracy of the imbalance rate IMB, detection of the imbalance rate IMB is executed several times in an operating state except sudden acceleration and deceleration, and then, a plurality of imbalance rates IMB thus detected is averaged so as to calculate a final imbalance rate IMB. Incidentally, the calculation of the final imbalance rate IMB by averaging is one example, and the final imbalance rate IMB may be calculated by other methods.

Further, the internal combustion engine 11 of the present embodiment includes the port injector 22 and the in-cylinder injector 17. On this account, as the imbalance rate IMB, a port imbalance rate IMBp indicative of a degree of variation among the cylinders in terms of a fuel amount to be injected from the port injector 22 and an in-cylinder imbalance rate IMBd indicative of a degree of variation among the cylinders in terms of a fuel amount to be injected from the in-cylinder injector 17 are detected. Note that the port imbalance rate IMBp corresponds to a first variation degree and the in-cylinder imbalance rate IMBd corresponds to a second variation degree.

It is desirable that the detection of such a port imbalance rate IMBp be performed at the time when only port injection is performed. However, in a case where port injection and in-cylinder injection are performed together, the imbalance rate IMB detected at this time is corrected according to the port injection amount ratio Rp, for example, so that the port imbalance rate IMBp can be detected. Similarly, it is desirable that the detection of the in-cylinder imbalance rate IMBd be performed at the time when only in-cylinder injection is performed. However, in a case where port injection and in-cylinder injection are performed together, the imbalance rate IMB detected at this time is corrected according to the in-cylinder injection amount ratio Rd, for example, so that the in-cylinder imbalance rate IMBd can be detected.

Incidentally, such a technique to detect a degree of variation among the cylinders has been already known well. For example, as well as the fluctuation amount of the upstream actual air-fuel ratio AFf, it is also known that, as the degree of variation among the cylinders is larger, a rotational fluctuation of the internal combustion engine becomes larger. Further, it is known that, as air-fuel ratios of some cylinders deviate toward a rich side relative to air-fuel ratios of the other cylinders, a concentration of hydrogen discharged from the cylinders becomes higher. Further, it is also known that, as a hydrogen concentration becomes higher as such, a sensor for detecting an air-fuel ratio detects hydrogen, and an output value from the sensor deviates toward a rich side relative to an output value corresponding to an actual air-fuel ratio. Accordingly, the degree of variation among the cylinders may be detected by use of the well-known technique.

Further, the control device 30 performs an air-fuel ratio control on the internal combustion engine 11 so that purification of the exhaust gas by the catalyst 100 is performed appropriately. Note that, in the air-fuel ratio control of the present embodiment, an upstream target air-fuel ratio AFfp, which is a target air-fuel ratio of the upstream actual air-fuel ratio AFf, and a downstream target air-fuel ratio AFrp, which is a target air-fuel ratio of the downstream actual air-fuel ratio AFr, are basically set to the theoretical air-fuel ratio.

The air-fuel ratio control is constituted by main feedback correction to correct a fuel injection amount so that the output value V1 of the upstream-side sensor 35 achieves an output value corresponding to the upstream target air-fuel ratio AFfp, and sub-feedback correction to correct the fuel injection amount thus corrected by the main feedback correction so that the output value V2 of the downstream-side sensor 36 achieves an output value corresponding to the downstream target air-fuel ratio AFrp. Note that the "output value corresponding to the upstream target air-fuel ratio AFfp" indicates an output value V1 of the upstream-side sensor 35 at the time when the upstream target air-fuel ratio AFfp accords with the upstream actual air-fuel ratio AFf. Further, the "output value corresponding to the downstream target air-fuel ratio AFrp" indicates an output value V2 of the downstream-side sensor 36 at the time when the downstream target air-fuel ratio AFrp accords with the downstream actual air-fuel ratio AFr.

The main feedback correction corrects the fuel injection amount Q, which is a total fuel amount to be injected from the port injector 22 and the in-cylinder injector 17, based on the output value V1 of the upstream-side sensor 35 provided on an upstream side relative to the catalyst 100, so as to control the upstream actual air-fuel ratio AFf detected by the upstream-side sensor 35 to approach the upstream target air-fuel ratio AFfp.

In the main feedback correction, a proportional term, and an integration term and a derivative term as learning values are calculated from a deviation between the upstream actual air-fuel ratio AFf and the upstream target air-fuel ratio AFfp, and a proportional gain, an integral gain, and a derivative gain found experimentally in advance. Then, a PID control to calculate a correction value for a currently set fuel injection amount from a sum of the proportional term, the integration term, and the derivative term is performed. Note that the main feedback correction may be a feedback control such as a PI control to calculate a correction amount based on the proportional term and the integration term.

The sub-feedback correction is a control to further correct the correction value calculated by the main feedback correction, based on the output value V2 of the downstream-side sensor 36 provided on a downstream side relative to the catalyst 100. In the present embodiment, the control device 30 performs a feedback control such as a PID control or a PI control based on a deviation between the output value V2 of the downstream-side sensor 36 and that output value of the downstream-side sensor 36 which corresponds to the downstream target air-fuel ratio AFrp so that these output values accord with each other.

In the meantime, as described above, when a variation among the cylinders occurs, the concentration of hydrogen discharged from the cylinders increases. Accordingly, the upstream-side sensor 35 detects hydrogen, so that the output value V1 of the upstream-side sensor 35 deviates toward a rich side relative to an output value corresponding to the upstream actual air-fuel ratio AFf. When the output value V1 of the upstream-side sensor 35 deviates toward a rich side as such, the fuel injection amount is wrongly corrected to be decreased in the air-fuel ratio control, so that the upstream actual air-fuel ratio AFf deviates toward a lean side, thereby resulting in that exhaust-gas purification performance of the catalyst 100 decreases. Incidentally, when hydrogen included in the exhaust gas passes through the catalyst 100, the hydrogen is oxidized. On that account, differently from the output value V1 of the upstream-side sensor 35, the output value V2 of the downstream-side sensor 36 is a right output value corresponding to the actual air-fuel ratio. Accordingly, from the above reason, even in a case where the upstream actual air-fuel ratio AFf is wrongly corrected toward a lean side relative to the target air-fuel ratio, the downstream-side sensor 36 correctly detects the downstream actual air-fuel ratio AFr, and its output value V2 indicates a lean state.

In the present embodiment, false correction of the fuel injection amount due to that deviation of the output value V1 of the upstream-side sensor 35 which is caused by the variation among the cylinders is restrained, and a stoichiometry correction value SH is calculated as a value to correct the upstream target air-fuel ratio AFfp so that an air-fuel ratio of the exhaust gas flowing into the catalyst 100 achieves the theoretical air-fuel ratio. The stoichiometry correction value SH is a value to correct the upstream target air-fuel ratio AFfp, which is basically set to the theoretical air-fuel ratio, so as to become an air-fuel ratio on a rich side relative to the theoretical air-fuel ratio. When the upstream target air-fuel ratio AFfp is corrected to a rich side, the fuel injection amount Q to be corrected by the air-fuel ratio control is increased as compared with a state before the upstream target air-fuel ratio AFfp is corrected to a rich side.

By increasing the fuel injection amount Q, false decrease correction of the fuel injection amount is restrained so that the upstream actual air-fuel ratio AFf returns to a rich side. Hereby, the air-fuel ratio of the exhaust gas flowing into the catalyst 100 is adjusted to the theoretical air-fuel ratio. As such, the stoichiometry correction value SH is a value to correct the upstream target air-fuel ratio AFfp to a rich side, and is a correction value necessary to set, to the theoretical air-fuel ratio, that atmosphere of the catalyst 100 which becomes lean due to deviation of the output value V1 of the upstream-side sensor 35.

The following describes a correction process of the upstream target air-fuel ratio AFfp with the stoichiometry correction value SH, with reference to FIGS. 4 to 7. Note that the process is repeatedly performed by the control device 30 every predetermined period.

Figure 4:
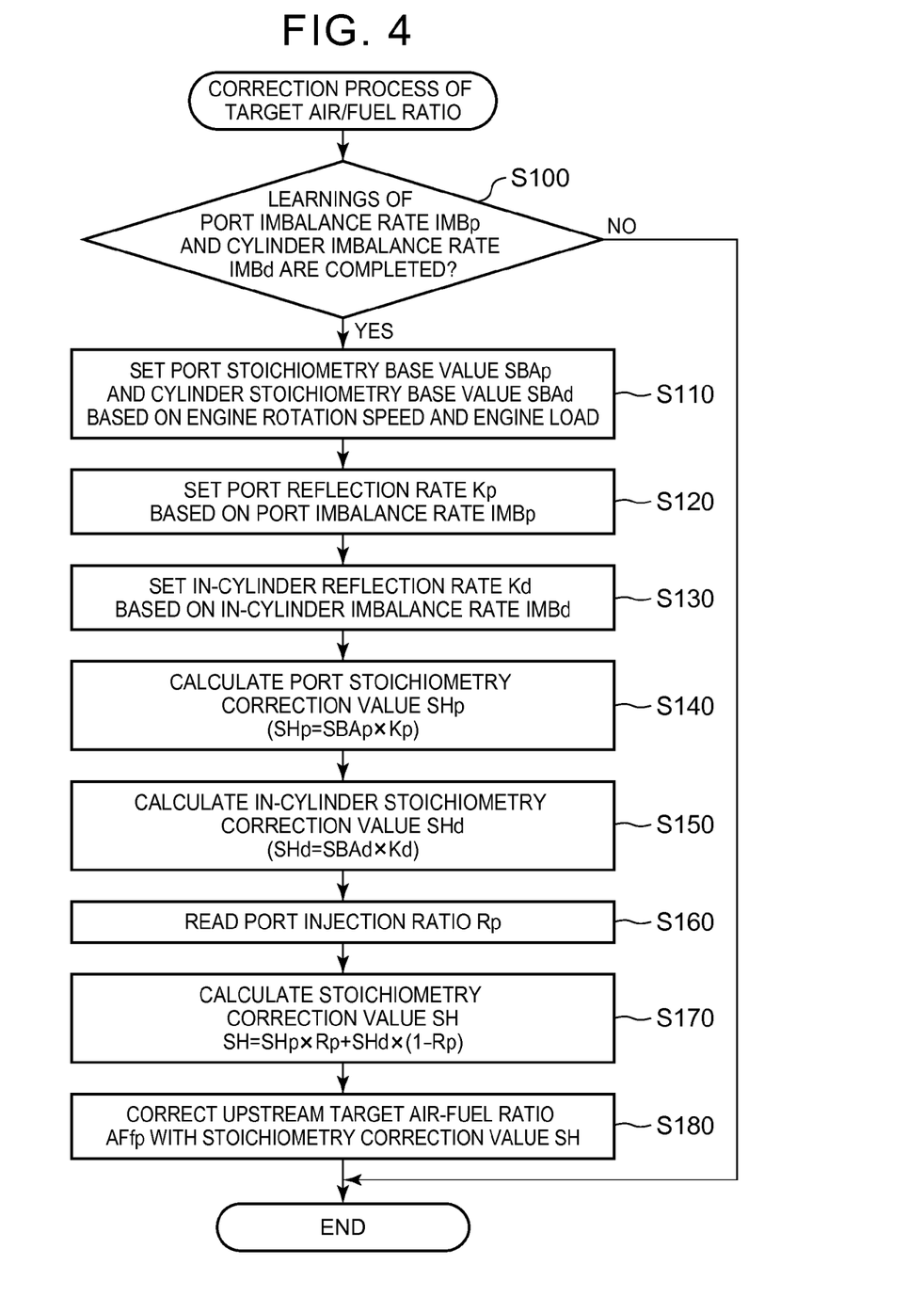
FIG. 4 is a flowchart illustrating a correction procedure of a target air-fuel ratio with a stoichiometry correction value in the internal combustion engine.

As illustrated in FIG. 4, when the process is started, first, it is determined whether learnings of a port imbalance rate IMBp and a in-cylinder imbalance rate IMBd are completed or not (S100). The completion of the learning of the port imbalance rate IMBp indicates a state where averaging of port imbalance rates IMBp detected several times is completed, as mentioned earlier. Similarly, the completion of the learning of the in-cylinder imbalance rate IMBd indicates a state where averaging of in-cylinder imbalance rates IMBd detected several times is completed, as mentioned earlier.

When the learnings of the port imbalance rate IMBp and the in-cylinder imbalance rate IMBd are both not completed (S100: NO), the process is finished once. In the meantime, when the learnings of the port imbalance rate IMBp and the in-cylinder imbalance rate IMBd are both completed (S100: YES), a port stoichiometry base value SBAp and a in-cylinder stoichiometry base value SBAd are set based on an engine rotation speed NE and an engine load KL (S110).

Figure 5:
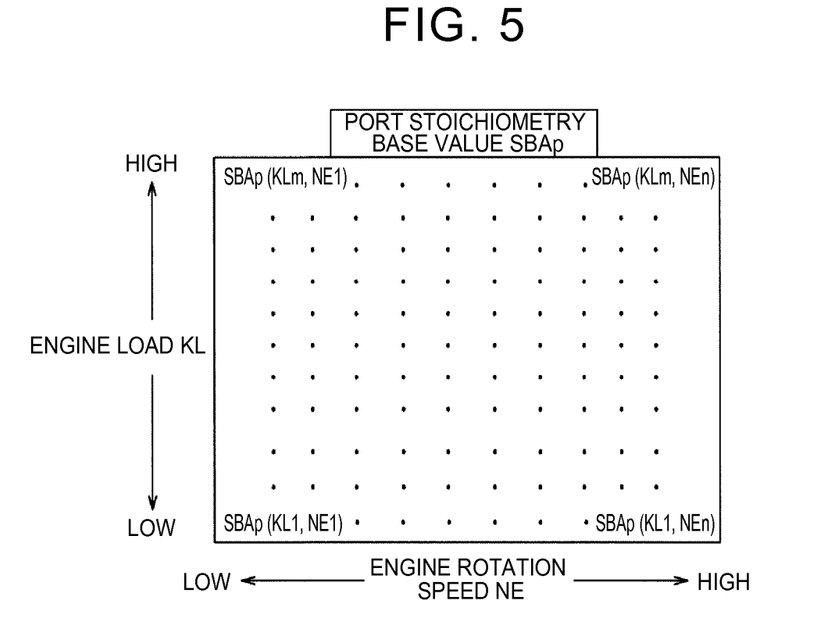
FIG. 5 is a map configuration diagram of a port stoichiometry correction value in the correction process of the target air-fuel ratio.

As illustrated in FIG. 5, the port stoichiometry base value SBAp is found from a map based on the engine rotation speed NE and the engine load KL. Note that the port stoichiometry base value SBAp may be found in other ways, e.g., a function formula or the like, which is different from the map.

The port stoichiometry base value SBAp is a base value of the stoichiometry correction value SH which base value is necessary to cause an atmosphere of the catalyst 100 to have the theoretical air-fuel ratio, which atmosphere becomes lean due to that deviation of the output value V1 of the upstream-side sensor 35 which is caused by variation among the cylinders in terms of a fuel amount to be injected from the port injector 22. More specifically, the port stoichiometry base value SBAp is a stoichiometry correction value SH at the time when the port imbalance rate IMBp is a predetermined reference imbalance rate KIMB. Here, even in a case where a degree of variation among the cylinders is the same, if the engine load KL and the engine rotation speed NE are different, an influence of a hydrogen concentration in the exhaust gas with respect to the output value V1 of the upstream-side sensor 35 becomes different. In view of this, the port stoichiometry base value SBAp of the present embodiment is set variably based on the engine rotation speed NE and the engine load KL.

Figure 6:
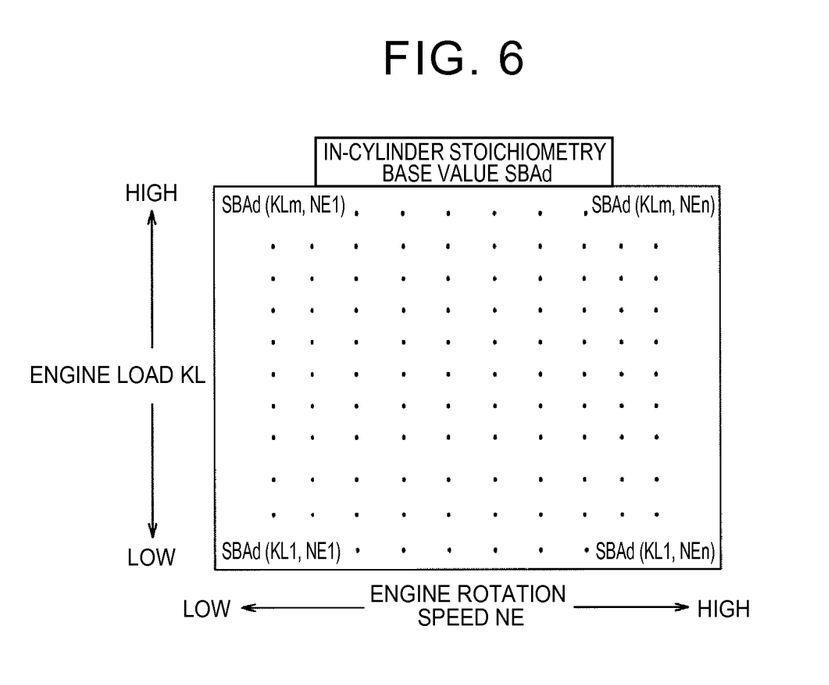
FIG. 6 is a map configuration diagram of a cylinder stoichiometry correction value in the correction process of the target air-fuel ratio.

The in-cylinder stoichiometry base value SBAd is set in the same manner as the port stoichiometry base value SBAp. As illustrated in FIG. 6, the in-cylinder stoichiometry base value SBAd is also found from a map based on the engine rotation speed NE and the engine load KL. Note that the in-cylinder stoichiometry base value SBAd may be found in other ways, e.g., a function formula or the like, which is different from the map.

The in-cylinder stoichiometry base value SBAd is a base value of the stoichiometry correction value SH which base value is necessary to cause the atmosphere of the catalyst 100 to have the theoretical air-fuel ratio, which atmosphere becomes lean due to that deviation of the output value V1 of the upstream-side sensor 35 which is caused by variation among the cylinders in terms of a fuel amount to be injected from the in-cylinder injector 17. More specifically, the in-cylinder stoichiometry base value SBAd is a stoichiometry correction value SH at the time when the in-cylinder imbalance rate IMBd is a predetermined reference imbalance rate KIMB. Here, even in a case where a degree of variation among the cylinders is the same, if the engine load KL and the engine rotation speed NE are different, an influence of a hydrogen concentration in the exhaust gas with respect to the output value V1 of the upstream-side sensor 35 becomes different, as described above. In view of this, the in-cylinder stoichiometry base value SBAd is also set variably based on the engine rotation speed NE and the engine load KL.

Further, that deviation of the output value V1 of the upstream-side sensor 35 which is caused by a variation among the cylinders is changed according to a degree of variation among the cylinders. More specifically, the deviation of the output value V1 becomes larger as the port imbalance rate IMBp or the in-cylinder imbalance rate IMBd is larger. In view of this, a port reflection rate Kp to convert, into stoichiometry correction values SH corresponding to various port imbalance rates IMBp, the port stoichiometry base value SBAp that is set as the stoichiometry correction value SH at the time when the port imbalance rate IMBp is the reference imbalance rate KIMB is set based on the port imbalance rate IMBp (S120).

Figure 7:
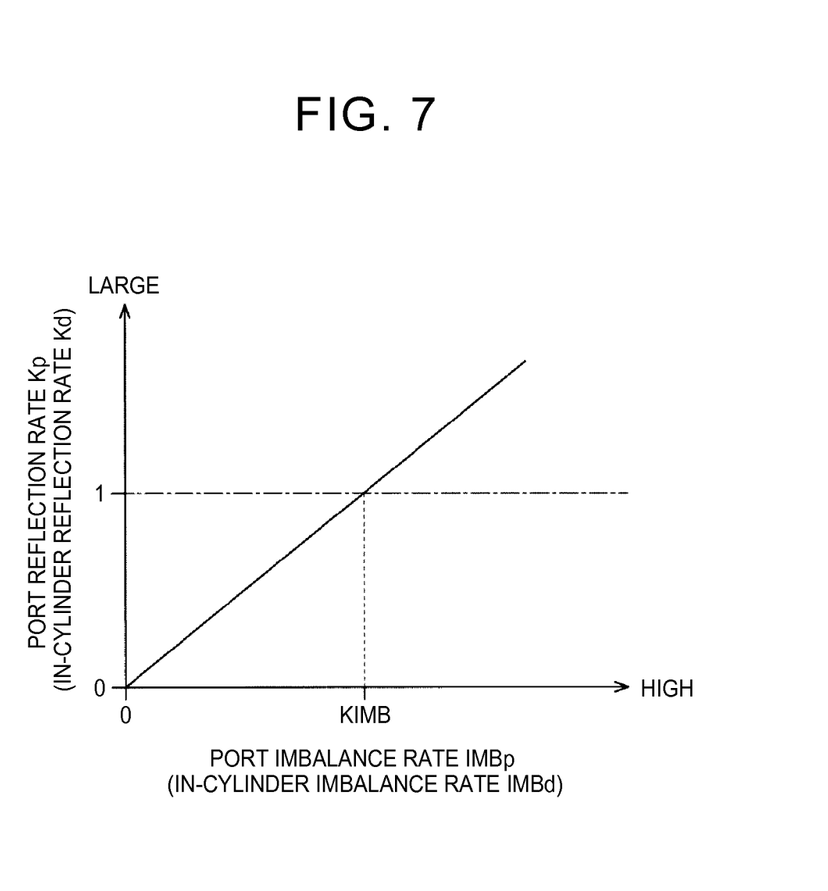
FIG. 7 is a graph illustrating a relationship between a port imbalance rate and a port reflection rate in the internal combustion engine.

As illustrated in FIG. 7, when the port imbalance rate IMBp accords with the reference imbalance rate KIMB, the port reflection rate Kp is set to "1." The port reflection rate Kp is set variably so as to gradually become a value higher than "1" as the port imbalance rate IMBp becomes higher than the reference imbalance rate KIMB. Further, the port reflection rate Kp is set variably so as to gradually become a value smaller than "1" as the port imbalance rate IMBp becomes lower than the reference imbalance rate KIMB. By setting the port reflection rate Kp as such, the port reflection rate Kp gradually changes to a larger value as the port imbalance rate IMBp becomes higher.

Similarly, an in-cylinder reflection rate Kd to convert, into stoichiometry correction values SH corresponding to various in-cylinder imbalance rates IMBd, the in-cylinder stoichiometry base value SBAd that is set as the stoichiometry correction value SH at the time when the in-cylinder imbalance rate IMBd is the reference imbalance rate KIMB is set based on the in-cylinder imbalance rate IMBd (S130).

As illustrated in FIG. 7, when the in-cylinder imbalance rate IMBd accords with the reference imbalance rate KIMB, the in-cylinder reflection rate Kd is set to "1." The in-cylinder reflection rate Kd is set variably so as to gradually become a value higher than "1" as the in-cylinder imbalance rate IMBd becomes higher than the reference imbalance rate KIMB. Further, the in-cylinder reflection rate Kd is set variably so as to gradually become a value smaller than "1" as the in-cylinder imbalance rate IMBd becomes lower than the reference imbalance rate KIMB. By setting the in-cylinder reflection rate Kd as such, the in-cylinder reflection rate Kd gradually changes to a larger value as the in-cylinder imbalance rate IMBd becomes higher.

Subsequently, the port stoichiometry base value SBAp is multiplied by the port reflection rate Kp, so as to calculate a port stoichiometry correction value SHp corresponding to a current port imbalance rate IMBp, a current engine load KL, and a current engine rotation speed NE (S140). Here, as described above, the port reflection rate Kp gradually changes to a larger value as the port imbalance rate IMBp becomes higher. Accordingly, a value of the port stoichiometry correction value SHp becomes larger as the port imbalance rate IMBp is higher. Note that the port stoichiometry correction value SHp corresponds to a first correction value.

Similarly, the in-cylinder stoichiometry base value SBAd is multiplied by the in-cylinder reflection rate Kd, so as to calculate a in-cylinder stoichiometry correction value SHd corresponding to a current in-cylinder imbalance rate IMBd, a current engine load KL, and a current engine rotation speed NE (S150). Here, as described above, the in-cylinder reflection rate Kd gradually changes to a larger value as the in-cylinder imbalance rate IMBd becomes higher. Accordingly, a value of the in-cylinder stoichiometry correction value SHd becomes larger as the in-cylinder imbalance rate IMBd is higher. Note that the in-cylinder stoichiometry correction value SHd corresponds to a second correction value.

Subsequently, a port injection amount ratio Rp currently set is read (S160), and then, a final stoichiometry correction value SH is calculated based on Formula (1) as below (S170).

$$SH = SHp \times Rp + SHd \times (1-Rp) \qquad (1)$$

SH: stoichiometry correction value, SHp: port stoichiometry correction value, SHd: in-cylinder stoichiometry correction value, Rp: port injection amount ratio, $1-Rp=Rd$: in-cylinder injection amount ratio formula As can be seen from Formula (1), the stoichiometry correction value SH is calculated as a weighted average value obtained by reflecting fuel injection amount ratios on the port stoichiometry correction value SHp and the in-cylinder stoichiometry correction value SHd.

Subsequently, an upstream target air-fuel ratio AFfp currently set is multiplied by the stoichiometry correction value SH, so as to correct the upstream target air-fuel ratio AFfp to a rich side (S180), and hereby, this process is finished once.

When the upstream target air-fuel ratio AFfp is corrected to a rich side as such, the fuel injection amount Q is corrected to be increased so that the upstream actual air-fuel ratio AFf has a value on a rich side as compared with a value before the correction. Accordingly, that atmosphere of the catalyst 100 which becomes lean due to deviation of the output value V1 of the upstream-side sensor 35 is changed to an atmosphere having the theoretical air-fuel ratio.

According to the present embodiment described above, it is possible to obtain the following effects. (1) The fuel injection amount Q to be corrected in the air-fuel ratio control is corrected to be increased through correction of the upstream target air-fuel ratio AFfp to a rich side with the stoichiometry correction value SH using the port stoichiometry correction value SHp and the in-cylinder stoichiometry correction value SHd. Here, the port imbalance rate IMBp indicative of a degree of variation among the cylinders in terms of a fuel amount to be injected from the port injector 22 and the port injection amount ratio Rp are reflected on the port stoichiometry correction value SHp. Further, the in-cylinder imbalance rate IMBd indicative of a degree of variation among the cylinders in terms of a fuel amount to be injected from the in-cylinder injector 17 and the in-cylinder injection amount ratio Rd are reflected on the in-cylinder stoichiometry correction value SHd. Accordingly, the upstream target air-fuel ratio AFfp is corrected according to the port imbalance rate IMBp, the in-cylinder imbalance rate IMBd, and the fuel injection amount ratios. Accordingly, correction of the upstream target air-fuel ratio AFfp to restrain false correction of the fuel injection amount is performed appropriately in accordance with a fuel injection mode and the degree of variation among the cylinders, so that deviation of an actual air-fuel ratio due to false correction of the fuel injection amount is restrained appropriately. On that account, even in a case where the port injector 22 and the in-cylinder injector 17 are provided, it is possible to restrain a decrease in exhaust-gas purification performance due to a variation among the cylinders.

Further, as described above, an influence of the port imbalance rate IMBp and the in-cylinder imbalance rate IMBd with respect to deviation of a sensor output value changes according to the injection amount ratios of the port injector 22 and the in-cylinder injector 17. However, in the present embodiment, the port stoichiometry correction value SHp and the in-cylinder stoichiometry correction value SHd are set variably in accordance with such a change of the injection amount ratios. Accordingly, even in a state where the fuel is injected from both the port injector 22 and the in-cylinder injector 17, that is, even in a state where separate injection of the fuel is performed, the upstream target air-fuel ratio AFfp is corrected appropriately. Accordingly, even in a state where the fuel is injected from both the port injector 22 and the in-cylinder injector 17, it is possible to restrain a decrease in exhaust-gas purification performance which decrease is caused due to variation among the cylinders.

(2) The deviation of the output value V1 of the upstream-side sensor 35 due to variation among the cylinders is changed according to a degree of variation among the cylinders, as described above. Further, even in a case where the degree of variation among the cylinders is the same, if the engine load KL and the engine rotation speed NE are different, an influence of a hydrogen concentration in exhaust gas with respect to the output value V1 of the upstream-side sensor 35 becomes different. In view of this, the port stoichiometry correction value SHp to correct the upstream target air-fuel ratio AFfp is set variably based on the port imbalance rate IMBp, the engine load KL, and the engine rotation speed NE. Similarly, the in-cylinder stoichiometry correction value SHd to correct the upstream target air-fuel ratio AFfp is also set variably based on the in-cylinder imbalance rate IMBd, the engine load KL, and the engine rotation speed NE. Accordingly, even if the degree of variation among the cylinders, the engine load KL, or the engine rotation speed NE is changed, the upstream target air-fuel ratio AFfp is corrected appropriately so that the catalyst 100 has an atmosphere with the theoretical air-fuel ratio.

(3) It is possible to appropriately maintain exhaust-gas purification performance at the time when a variation occurs among the cylinders. Accordingly, in comparison with a case where the exhaust-gas purification performance cannot be maintained appropriately, an abnormal determination value of an imbalance rate IMB (abnormal determination values of the port imbalance rate IMBp and the in-cylinder imbalance rate IMBd) for determining an adverse effect on the exhaust-gas purification performance can be set to a high value. Accordingly, a difference in the imbalance rate IMB between a normal time and an abnormal time becomes clear, thereby making it possible to increase accuracy of abnormality determination on the imbalance rate IMB.

(4) As described above, since a difference in the imbalance rate IMB between a normal time and an abnormal time becomes clear, even in a case where response of the upstream-side sensor 35 to be used for detection of the imbalance rate IMB is relatively slow, it is possible to appropriately perform abnormality determination on the imbalance rate IMB. Accordingly, it is possible to restrain an increase in cost caused by selectively using a high-response upstream-side sensor 35 and an increase in cost to increase the response of the upstream-side sensor 35.

Further, if a passage sectional area of an exhaust passage is narrowed, an exhaust-gas flow rate per unit time increases, thereby making it possible to increase the response of the upstream-side sensor 35. However, pressure loss in the exhaust passage increases, which may cause adverse effect on engine output. In this regard, according to the above embodiment, even in a case where the response of the upstream-side sensor 35 is relatively slow, it is possible to appropriately perform abnormality determination on the imbalance rate IMB. This makes it possible to restrain occurrence of such inconvenience caused by narrowing the passage sectional area of the exhaust passage.

Note that the above embodiment can be modified as follows. In order to convert, into stoichiometry correction values SH corresponding to various imbalance rates, a base value set as the stoichiometry correction value SH at the time when the imbalance rate is the reference imbalance rate KIMB, the port reflection rate Kp and the in-cylinder reflection rate Kd are set. However, in other aspects, stoichiometry correction values SH corresponding to various imbalance rates may be set. For example, the map as illustrated in FIG. 5 may be set for each of various port imbalance rates IMBp. That is, a map for setting the port stoichiometry correction value SHp based on the engine load KL and the engine rotation speed NE may be set for each of various port imbalance rates IMBp. Further, the port stoichiometry correction value SHp may be calculated from a function formula that takes the port imbalance rate IMBp, the engine load KL, and the engine rotation speed NE as variables.

Similarly, the map as illustrated in FIG. 6 may be set for each of various in-cylinder imbalance rates IMBd. That is, a map for setting the in-cylinder stoichiometry correction value SHd based on the engine load KL and the engine rotation speed NE may be set for each of various in-cylinder imbalance rate IMBd. Further, the in-cylinder stoichiometry correction value SHd may be calculated from a function formula that takes the in-cylinder imbalance rate IMBd, the engine load KL, and the engine rotation speed NE as variables.

An actual atmosphere of the catalyst 100 is reflected on the output value V2 of the downstream-side sensor 36 described above without being affected by the hydrogen concentration in the exhaust gas. On that account, the stoichiometry correction value SH may be further corrected according to the output value V2 of the downstream-side sensor 36. In this case, the actual atmosphere of the catalyst 100 is reflected on the stoichiometry correction value SH, so the atmosphere of the catalyst 100 can be more appropriately changed into an atmosphere with the theoretical air-fuel ratio.

The port stoichiometry correction value SHp and the in-cylinder stoichiometry correction value SHd are calculated based on the degree of variation among the cylinders, the engine load KL, and the engine rotation speed NE, so as to calculate the stoichiometry correction value SH by use of those values. In addition, as described above, the actual atmosphere of the catalyst 100 is reflected on the output value V2 of the downstream-side sensor 36 described above without being affected by the concentration of hydrogen discharged from the cylinders. In view of this, the stoichiometry correction value SH may be set based on the output value V2 of the downstream-side sensor 36. Even in this case, the actual atmosphere of the catalyst 100 is reflected on the stoichiometry correction value SH, so the atmosphere of the catalyst 100 can be more appropriately changed into an atmosphere with the theoretical air-fuel ratio.

The deviation of the output value V1 of the upstream-side sensor 35 changes according to the concentration of hydrogen discharged from the cylinders. In view of this, a sensor for detecting the concentration of hydrogen discharged from the cylinders is provided on an upstream side relative to the catalyst 100. Then, the stoichiometry correction value SH may be set based on a hydrogen concentration detected by the sensor. In this case, the stoichiometry correction value SH is set according to an actual hydrogen concentration included in the exhaust gas, that is, an actual deviation degree of the output value V1 of the upstream-side sensor 35. Accordingly, even in this modification, the atmosphere of the catalyst 100 can be more appropriately changed into an atmosphere with the theoretical air-fuel ratio.

The stoichiometry correction value SH is a value to correct the upstream target air-fuel ratio AFfp to a rich side, and a necessary correction value to cause the atmosphere of the catalyst 100 to have the theoretical air-fuel ratio, which atmosphere becomes lean due to deviation of the output value V1 of the upstream-side sensor 35.

In the meantime, in a case where the atmosphere of the catalyst 100 becomes rich due to deviation of the output value V1 of the upstream-side sensor 35, the stoichiometry correction value SH is changed to a value to correct the upstream target air-fuel ratio AFfp to a lean side. More specifically, the port stoichiometry base value SBAp is set to that base value of the stoichiometry correction value SH which is necessary to cause the atmosphere of the catalyst 100 to have the theoretical air-fuel ratio, which atmosphere becomes rich due to that deviation of the output value V1 of the upstream-side sensor 35 which is caused by variation among the cylinders in terms of a fuel amount to be injected from the port injector 22. Similarly, the in-cylinder stoichiometry base value SBAd is set to that base value of the stoichiometry correction value SH which is necessary to cause the atmosphere of the catalyst 100 to have the theoretical air-fuel ratio, which atmosphere becomes rich due to that deviation of the output value V1 of the upstream-side sensor 35 which is caused by variation among the cylinders in terms of a fuel amount to be injected from the in-cylinder injector 17. Then, the stoichiometry correction value SH is calculated in the same manner as the above embodiment. Hereby, it is possible to obtain the same effect as in the above embodiment.

The downstream-side sensor 36 may be an air-fuel ratio sensor similar to the upstream-side sensor 35. In a case where an injector causing variation among the cylinders can be specified individually, a different correction amount relative to the upstream target air-fuel ratio AFfp may be set for each injector.

The embodiment and the alternative embodiments described above are illustrative and not restrictive in all respects. The scope of the invention is defined by not only the above description but also the appended claims. The scope of the invention is intended to encompass all modifications within the scope of the appended claims and the meaning and scope of equivalents thereof.

What is claimed is:

1. A control apparatus for an internal combustion engine, the control apparatus comprising:
    an intake-port fuel injection valve provided in each of a plurality of cylinders, the intake-port fuel injection valve being configured to inject fuel into an intake port of the internal combustion engine;
    an in-cylinder fuel injection valve provided in each of the plurality of cylinders of the internal combustion engine, the in-cylinder fuel injection valve being configured to inject fuel into a combustion chamber of the internal combustion engine;
    a catalyst provided in an exhaust passage of the internal combustion engine, the catalyst being configured to purify gas exhausted from the internal combustion engine;
    an upstream-side sensor configured to output an output value corresponding to an actual air-fuel ratio on an upstream side relative to the catalyst; and
    an electronic control unit configured to:
        (i) change, according to an engine operation state, injection amount ratios of the fuel to be injected from the intake-port fuel injection valve and the fuel to be injected from the in-cylinder fuel injection valve, relative to a total fuel amount to be injected from the intake-port fuel injection valve and the in-cylinder fuel injection valve,
        (ii) execute an air-fuel ratio control of controlling the actual air-fuel ratio to a target air-fuel ratio by correcting the total fuel amount such that the output value of the upstream-side sensor achieves an output value corresponding to the target air-fuel ratio,
        (iii) detect a first variation degree indicative of a degree of variation among the cylinders in terms of a fuel amount to be injected from the intake-port fuel injection valve,
        (iv) detect a second variation degree indicative of a degree of variation among the cylinders in terms of a fuel amount to be injected from the in-cylinder fuel injection valve,
        (v) set a first correction value based on the first variation degree such that a first correction amount of the target air-fuel ratio by the first correction value is set to be larger as the injection amount ratio of the intake-port fuel injection valve is larger,
        (vi) set a second correction value based on the second variation degree such that a second correction amount of the target air-fuel ratio by the second correction value is set to be larger as the injection amount ratio of the in-cylinder fuel injection valve is larger, and
        (vii) correct the target air-fuel ratio with the first correction value and the second correction value.

2. The control apparatus according to claim 1, wherein the electronic control unit is configured to set the first correction value based on the first variation degree, an engine load, and an engine rotation speed.

3. The control apparatus according to claim 2, wherein the electronic control unit is configured to obtain the first correction value from a map that uses variables including the first variation degree, the engine load, and the engine rotation speed.

4. The control apparatus according to claim 2, wherein the electronic control unit is configured to obtain the first correction value from a function formula that uses variables including the first variation degree, the engine load, and the engine rotation speed.

5. The control apparatus according to claim 1, wherein the electronic control unit is configured to set the second correction value based on the second variation degree, an engine load, and an engine rotation speed.

6. The control apparatus according to claim 5, wherein the electronic control unit is configured to obtain the second correction value from a map that uses variables including the second variation degree, the engine load, and the engine rotation speed.

7. The control apparatus according to claim 5, wherein the electronic control unit is configured to obtain the second correction value from a function formula that uses variables including the second variation degree, the engine load, and the engine rotation speed.

* * * * *